United States Patent
Ferraris et al.

(10) Patent No.: US 11,535,084 B2
(45) Date of Patent: Dec. 27, 2022

(54) MOTOR-VEHICLE AUXILIARY VENTILATION SYSTEM

(71) Applicant: C.R.F. Società Consortile per Azioni, Orbassano (IT)

(72) Inventors: Walter Ferraris, Orbassano (IT); Federica Bettoja, Orbassano (IT); Fabrizio Mattiello, Orbassano (IT); Pietro Lazzaro, Turin (IT); Andrea Carzana, Turin (IT)

(73) Assignee: C.R.F. SOCIETA CONSORTILE PER AZIONI, Orbassano (IT)

( * ) Notice: Subject to any disclaimer, the term of this patent is extended or adjusted under 35 U.S.C. 154(b) by 140 days.

(21) Appl. No.: 16/561,396

(22) Filed: Sep. 5, 2019

(65) Prior Publication Data
US 2020/0108694 A1    Apr. 9, 2020

(30) Foreign Application Priority Data
Oct. 3, 2018  (EP) ...................................... 18198404

(51) Int. Cl.
*B60H 1/00* (2006.01)
*B60H 1/26* (2006.01)
(Continued)

(52) U.S. Cl.
CPC ......... *B60H 1/00849* (2013.01); *B60H 1/241* (2013.01); *B60H 1/26* (2013.01); *B60H 2001/3485* (2013.01)

(58) Field of Classification Search
CPC ...... B60H 1/00849; B60H 1/26; B60H 1/241; B60H 2001/3485; B60H 1/248;
(Continued)

(56) References Cited

U.S. PATENT DOCUMENTS

| 2005/0199845 A1* | 9/2005 | Jones ................... F16K 15/033 251/129.06 |
| 2007/0155300 A1 | 7/2007 | Hsieh |

(Continued)

FOREIGN PATENT DOCUMENTS

| CN | 108790702 A | 11/2018 |
| CN | 208393039 U | 1/2019 |

(Continued)

OTHER PUBLICATIONS

European Search Report and Written Opinion for European Patent Application No. 18198404.8-1012 dated Apr. 2, 2019.

*Primary Examiner* — Jessica Yuen
(74) *Attorney, Agent, or Firm* — Heslin Rothenberg Farley & Mesiti P.C.; Victor A. Cardona, Esq.

(57) ABSTRACT

A motor-vehicle includes one or more electrically-operated valves, arranged on the structure of the motor-vehicle in a lower position with respect to the windows, for providing a communication between a passenger compartment and the external environment, and one or more electronic control units programmed to activate a ventilation mode of the passenger compartment when the motor-vehicle is parked with the engine off, even with the driver outside the vehicle. The ventilation mode includes controlling at least partial opening of one or more windows and the opening of one or more of the valves to generate a flow of natural air from the bottom upwards through the passenger compartment of the motor-vehicle.

8 Claims, 9 Drawing Sheets

(51) Int. Cl.
      *B60H 1/24*           (2006.01)
      *B60H 1/34*           (2006.01)

(58) Field of Classification Search
     CPC ...... B60H 2001/00099; B60H 1/00771; B60H 1/00778; B60H 1/323; B60H 2001/00085; B60H 2001/00949; B60H 1/00357; B60H 1/00485; B60H 1/00657; E05Y 2800/414; E05Y 2800/75; E05F 15/71
     USPC .......................................................... 454/75
     See application file for complete search history.

(56) References Cited

U.S. PATENT DOCUMENTS

| | | | |
|---|---|---|---|
| 2016/0144692 A1* | 5/2016 | Brown | B60H 1/3226 62/133 |
| 2017/0028811 A1* | 2/2017 | Jayasundera | A61B 5/01 |
| 2017/0368905 A1 | 12/2017 | Li et al. | |
| 2017/0368908 A1* | 12/2017 | Cervantes | B60H 1/00821 |

FOREIGN PATENT DOCUMENTS

| | | |
|---|---|---|
| DE | 102013109068 A | 2/2015 |
| JP | H0740222 U | 7/1995 |
| WO | 2009065104 A1 | 5/2009 |

* cited by examiner

FIG. 1

PRIOR ART

MOTOR-VEHICLE AUXILIARY VENTILATION SYSTEM

CROSS REFERENCE TO RELATED APPLICATIONS

This application claims priority from European Patent Application No. 18198404.8 filed on Oct. 3, 2018, the entire disclosure of which is incorporated herein by reference.

FIELD OF THE INVENTION

The present invention relates to systems for ventilating the passenger compartment of a motor-vehicle.

PRIOR ART

In conventional vehicles, the problem arises of enabling activation of a ventilation mode of the passenger compartment of the motor-vehicle when the driver is still outside the motor-vehicle, for example, after the motor-vehicle has remained parked with the engine off for a prolonged time in a high temperature environment and exposed to solar radiation. In conventional motor-vehicles, activation of a ventilation mode of the passenger compartment before the driver even enters the motor-vehicle would result in the ignition of the internal combustion engine, but this operating condition is generally prohibited by current legislations in various countries, unless the vehicle is an electric or hybrid vehicle. For vehicles equipped with an internal combustion engine, the problem arises of activating the aforesaid operating modes without requiring ignition of the internal combustion engine.

OBJECT OF THE INVENTION

The object of the intervention of the present invention is to solve the above problem with a simple and low-cost system.

SUMMARY OF THE INVENTION

In view of achieving the aforesaid object, the invention relates to a motor-vehicle having a motor-vehicle structure defining a passenger compartment equipped with one or more electrically-operated windows, said motor-vehicle being characterized in that it comprises one or more electrically-operated valves, arranged on the structure of the motor-vehicle in a lower position with respect to said windows, so that the passenger compartment of the motor-vehicle communicates with the external environment, and one or more electronic control circuits programmed to activate a ventilation mode of the passenger compartment when the motor-vehicle is parked with the engine off, even with the driver outside the motor-vehicle, said passenger compartment ventilation mode comprising controlling at least partial opening of one or more windows and the opening of one or more of said valves for generating a natural air flow from the bottom upwards through the motor-vehicle passenger compartment.

In a preferred embodiment, said valves each comprise at least one shutter having an upper side mounted pivoting about a substantially horizontal axis on the motor-vehicle structure. In one example, said shutter is rigidly connected to a shaft rotatably mounted about said substantially horizontal axis on the structure of the motor-vehicle, said shaft being driven into rotation by means of an electric actuator. In this example, each valve comprises a pair of overlapping shutters.

Preferably, said one or more electronic control circuits are programmed to activate a ventilation mode of the passenger compartment, by at least partial opening of said one or more windows and by opening said one or more valves when the motor-vehicle is parked with the engine off, with the driver outside the motor-vehicle, said activation being controllable by the user by means of an electronic interface device such as a smart-phone, a tablet or the like.

Still preferably, said one or more electronic control circuits are programmed to subordinate said activation to one or more conditions, such as, for example, a signal confirming the fact that the motor-vehicle is in a guarded place and a signal confirming the absence of rainfall.

In a preferred embodiment, the motor-vehicle is also provided with an auxiliary refrigeration and/or heating system which allows cooling or heating of the passenger compartment of the motor-vehicle when the motor-vehicle is stationary with the engine off, even with the driver outside the motor-vehicle.

DETAILED DESCRIPTION OF THE EMBODIMENTS OF THE INVENTION

Further characteristics and advantages of the invention will become apparent from the description that follows with reference to the attached drawings, provided purely by way of non-limiting example, wherein:

FIGS. 1-9 and 13 refer to a preferred embodiment, wherein the motor-vehicle according to the invention is also provided with an auxiliary refrigeration and/or heating system of the passenger compartment, in addition to the auxiliary ventilation system. In particular:

Figure 1:
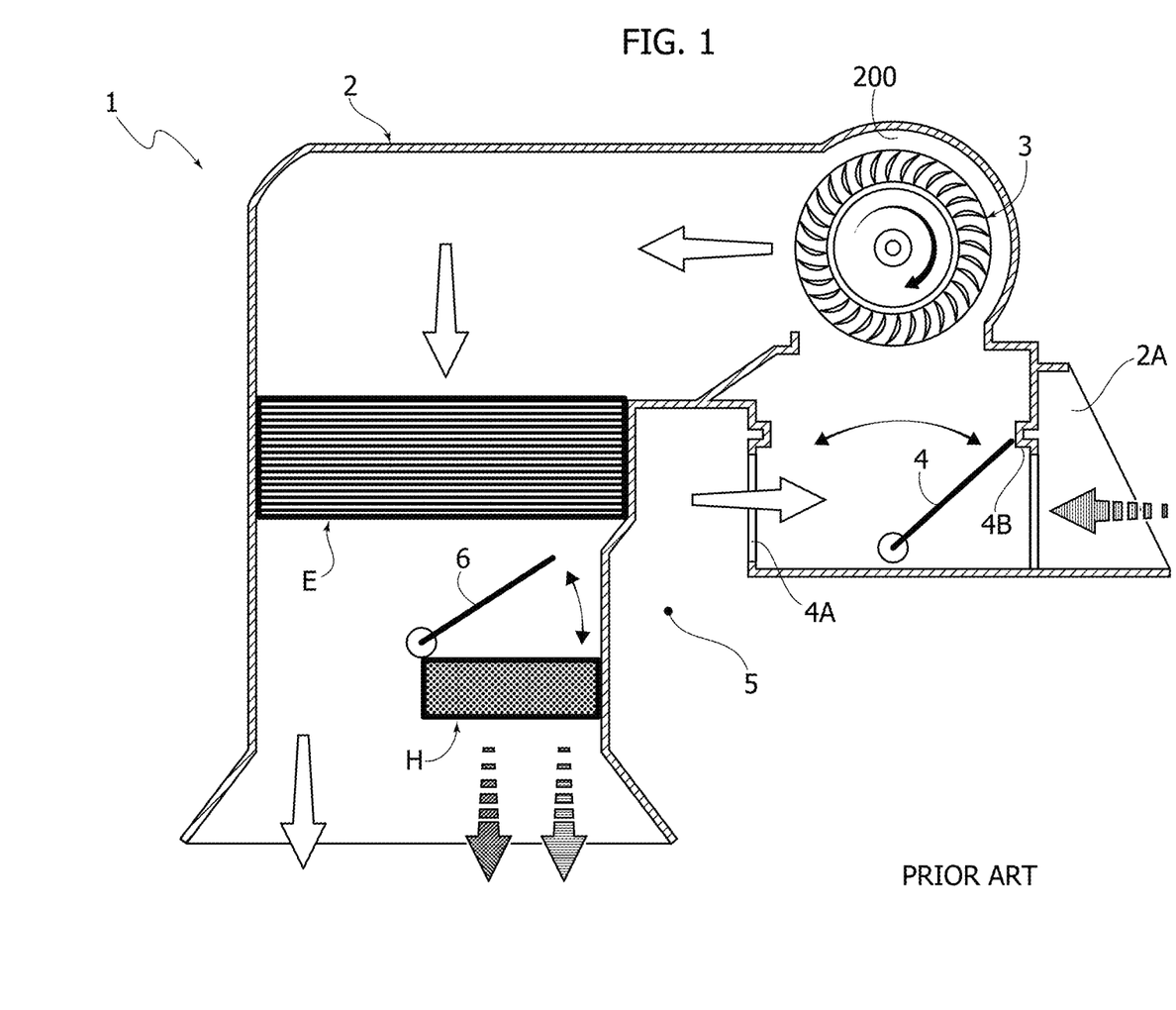
FIG. 1 is a schematic view of a heating, ventilation and air conditioning (HVAC) assembly for a motor-vehicle, produced according to the prior art.

In FIG. 1, numeral 1 indicates—in its entirety—a HVAC assembly of Heating, Ventilation and Air Conditioning of a motor-vehicle according to the conventional art. The assembly 1 includes an air guide duct indicated—in its entirety—with the reference 2, having an inlet opening 2A for the entry into the duct 2 of an air flow drawn from the external environment by means of an electrically-operated fan 3 located inside the duct 2. A shutter valve 4 is interposed between the inlet opening 2A and the fan 3, which connects the portion of the duct 2 in which the valve 3 is arranged selectively with the inlet opening 2A (when it is required to activate a flow of air from the outside into the duct 2) or with an opening 4A for communication of the duct 2 with the environment 5 inside the passenger compartment of the motor-vehicle (when it is required to recirculate the air of the passenger compartment in the duct). In FIG. 1, the shutter valve 4 is illustrated in the activation position for circulation of the air of the passenger compartment in the duct 2. In an operating position opposite to that illustrated in FIG. 1, rotated anti-clockwise (with reference to FIG. 1), the shutter valve 4 obstructs communication with the opening 4A and leaves the communication of the duct 2 with the inlet opening 2A free.

Again in the case of the conventional solution, an evaporator E is arranged within the duct 2, downstream of the fan 3, which is part of the main refrigeration circuit of which the motor-vehicle is provided.

According to the conventional art, the main refrigeration circuit F of the motor-vehicle (see FIG. 6) comprises a closed-loop path, through which a refrigerant flows, in which a compressor C, a condenser D, an expansion valve V and an evaporator E are arranged in succession.

Referring again to FIG. 1, a passenger compartment heater H is arranged downstream of the evaporator E, consisting of a heat exchanger through which the coolant of the internal combustion engine flows. A shutter valve 6 selectively opens and closes the access through the passenger compartment heater H. When the shutter valve 6 is in an open condition, the air flow through the duct 2 also passes partly through the heater H, heating up. When the shutter valve 6 is in the closed condition, the entire air flow through the duct 2 reaches the passenger compartment of the motor-vehicle without passing through the passenger compartment heater H, but only through the evaporator E, so that, if the main refrigeration circuit is activated, this flow is cooled.

Figure 2:
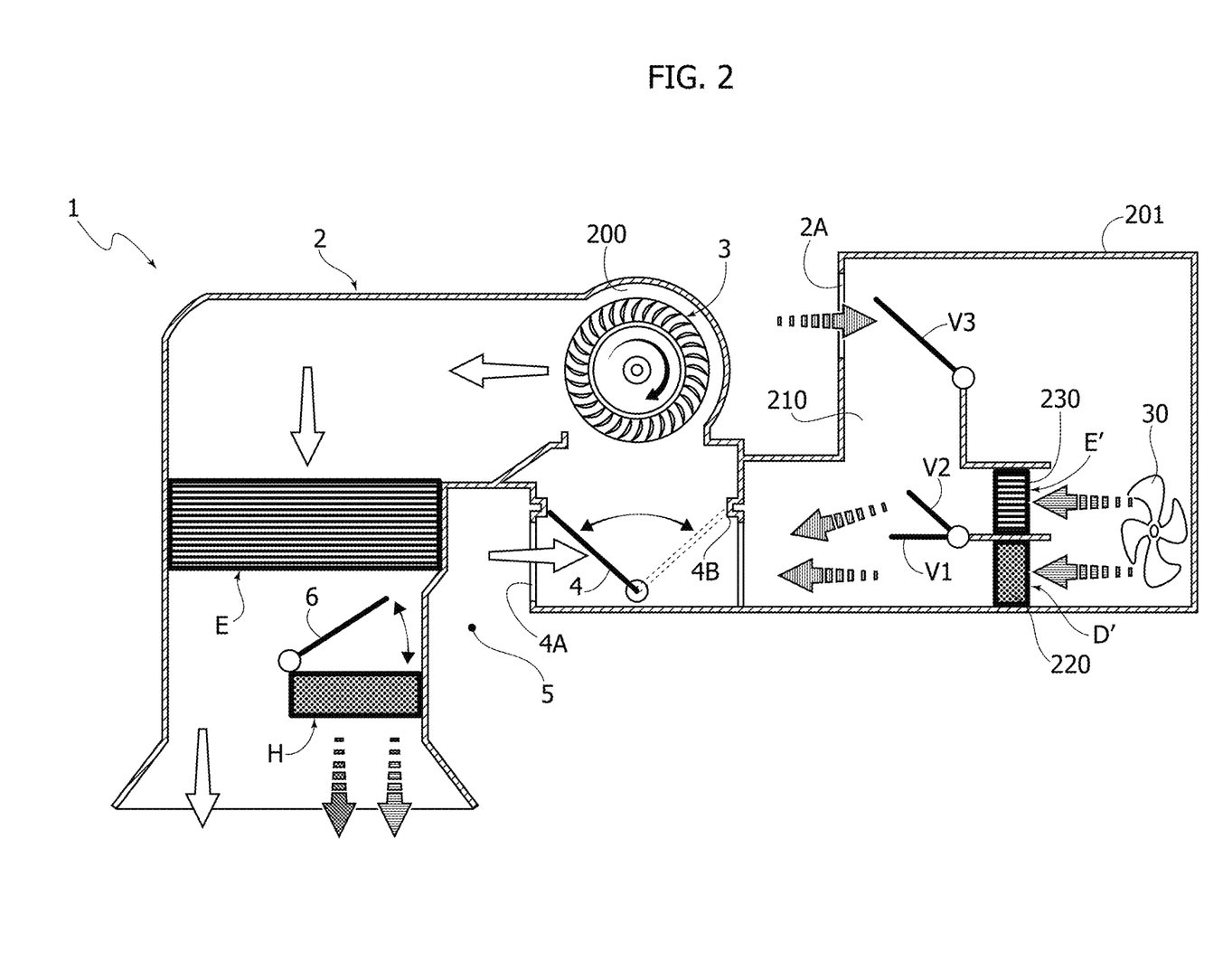
FIG. 2 illustrates the assembly of FIG. 1 modified according to a first embodiment.

FIG. 2 shows the assembly of FIG. 1 modified according to a preferred embodiment. In FIG. 2, the parts common to those of FIG. 1 are indicated by the same references.

In the case of the system of FIG. 2, the HVAC assembly comprises an air guide duct 2 which has a main portion 200, in which the above described components are arranged, with reference to FIG. 1 (valve 4, fan 3, evaporator E and heater H), and an auxiliary inlet portion 201, arranged upstream of the main portion 200.

Figure 6:
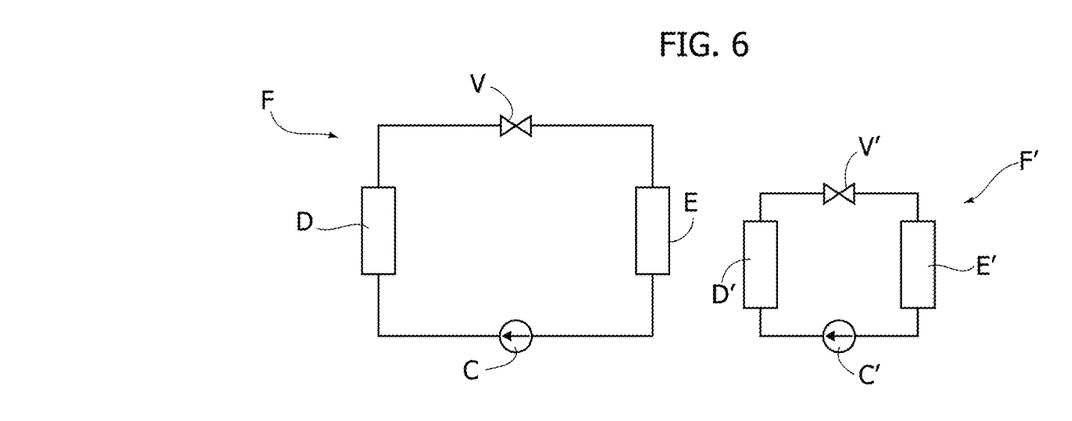
FIG. 6 is a schematic view of the main refrigeration circuit and of the auxiliary refrigeration circuit.

In the case of the system of FIG. 2, the motor-vehicle is provided with an auxiliary refrigeration circuit F' (the diagram of which is illustrated in FIG. 6 together with the diagram of the main refrigeration circuit F), which is formed per se as a normal refrigeration circuit, including a closed-loop path in which a compressor C', a condenser D', an expansion valve V' and an evaporator E' are arranged in succession (see FIG. 6). However, from the constructive point of view, the auxiliary refrigeration circuit has smaller dimensions and reduced power compared to the main refrigeration circuit. In particular, the compressor C' of the auxiliary refrigeration circuit is an electrically-operated compressor, with small dimensions and of reduced power compared to the size and power of the compressor of the main refrigeration circuit.

Returning to FIG. 2, the inlet opening 2A for the entry of an air flow from the outside into the air guide duct 2 is formed in the auxiliary inlet portion 201 of the duct 2, upstream of the main portion 200. The auxiliary inlet portion 201 of the duct 2 defines a by-pass passage 210 within it, which directly connects the inlet opening 2A with the main portion 200 of the duct 2 and, in particular, with the opening 4B for communicating with the portion of the duct in which the fan 3 is arranged.

Inside the auxiliary portion 201 of the air guide duct 2, an air heating duct 220 and an air cooling duct 230 are also defined, arranged parallel to each other and also arranged in parallel with respect to the by-pass passage 210. In the air heating passage 220, the condenser D' of the auxiliary refrigeration circuit is interposed. In the air cooling passage 230, the evaporator E' of the auxiliary refrigeration circuit is interposed. In the preferred embodiment shown here, an electrically-operated auxiliary fan 30 is arranged inside the auxiliary portion 201 of the air guide duct 2 to activate an air flow coming from the inlet opening 2A through the passages 220, 230.

The assembly of FIG. 2 comprises a valve system for enabling the passage of an air flow coming from the inlet opening 2A only through the by-pass passage 210 or only through the air heating passage 220, or only through the air cooling passage 230.

In the example schematically illustrated in FIG. 2, the valve system comprises a first shutter valve V1 which is configured to obstruct the passage 220 or leave it open, a second valve V2 which is configured to obstruct the passage 230 or leave it open, and a third valve V3 which is configured to obstruct the passage 210 or leave it open.

Figure 3:
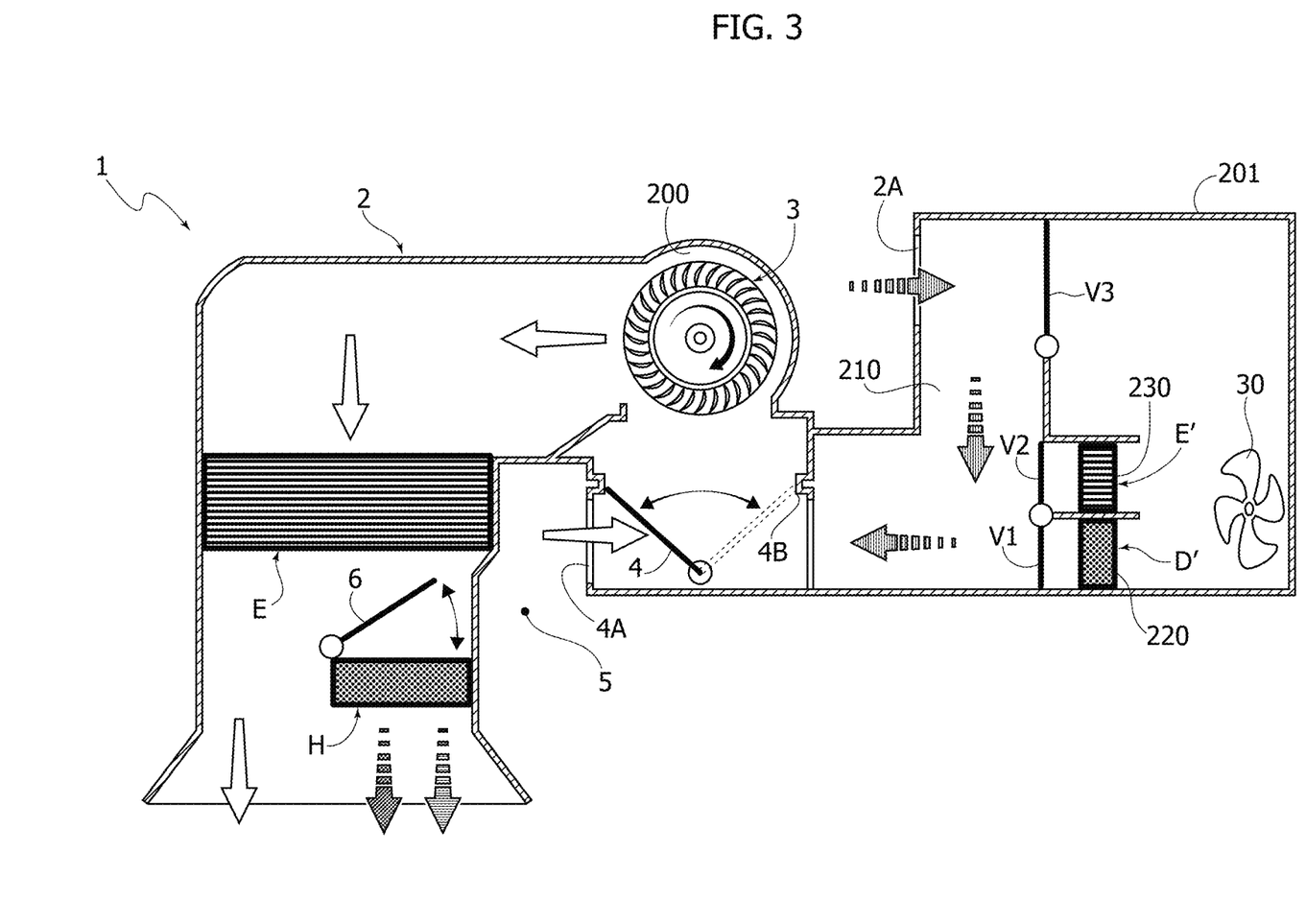
FIGS. 3-5 illustrate three different operating conditions of the assembly of FIG. 2.
Figure 4:
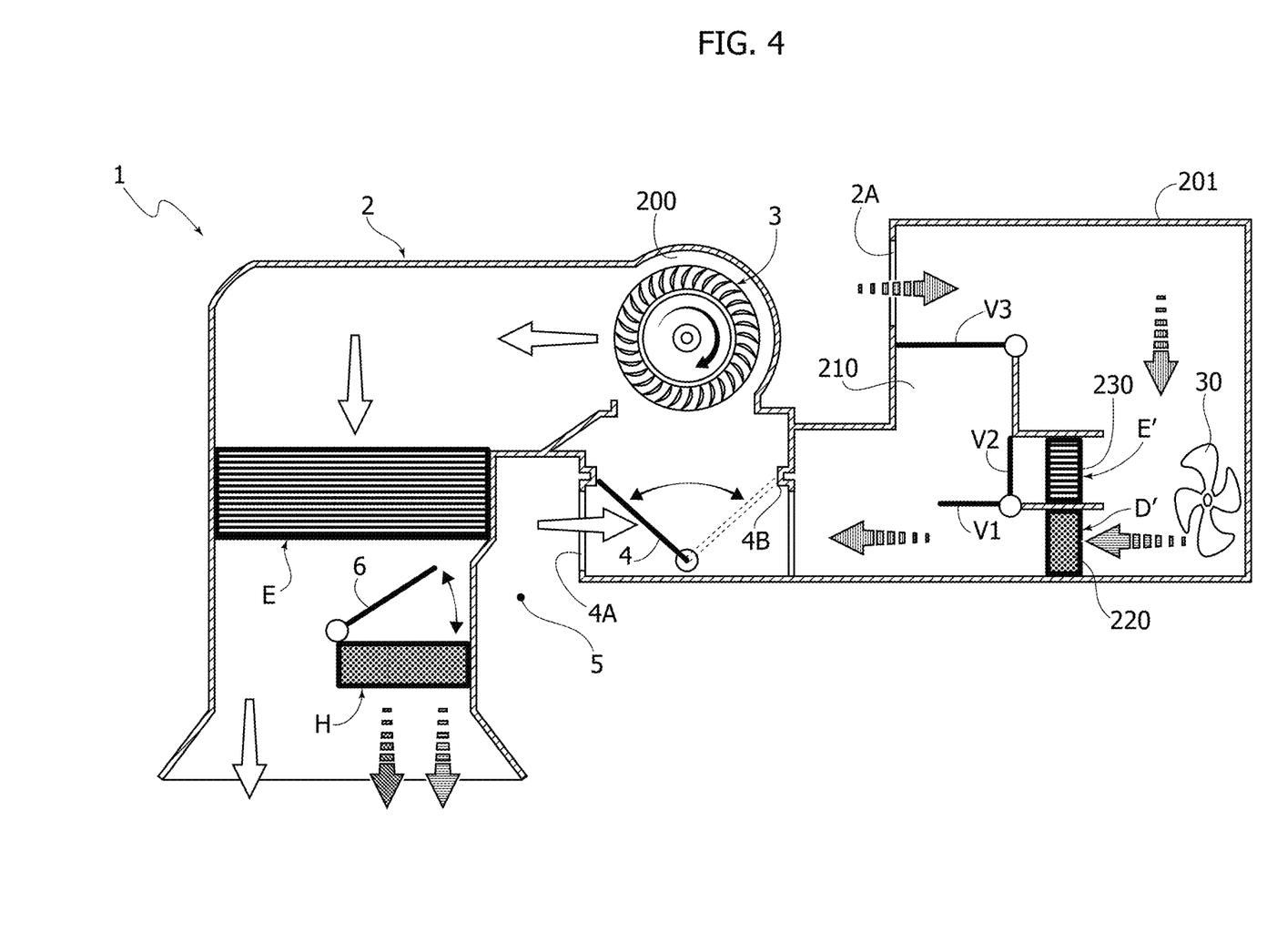
Figure 5:
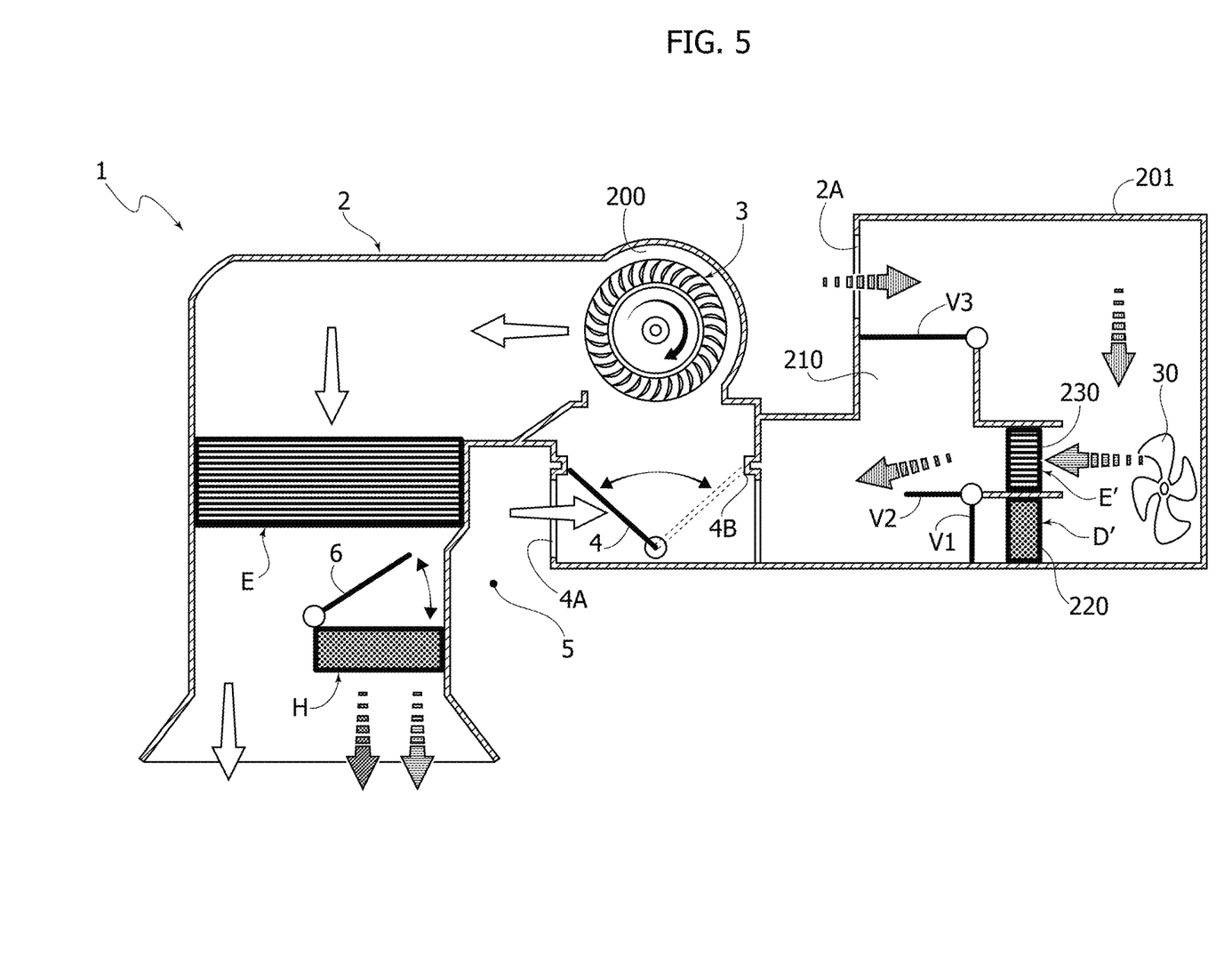

FIGS. 3-5 illustrate the different operating conditions of the aforesaid valves V1, V2, V3. In the condition of FIG. 3, the valves V1, V2 obstruct both passages 220, 230, while the valve V3 obstructs the connection between the inlet opening 2A and the passages 220, 230, while leaving the by-pass passage 210 free. In this condition, the system operates as a conventional system.

FIG. 4 shows an operating condition in which the valve V3 obstructs the connection between the inlet opening 2A and the by-pass passage 210, while it leaves the connection open between the inlet opening 2A and the two passages 220, 230. The valve V2 is in the closed condition, so that it obstructs the outlet of the passage 230, while the valve V1 is in the open condition, so that, in this condition the air flow entering through the opening 2A, activated by the fan 30 (also with an inactive fan 3) proceeds through the passage 220 and through the condenser D', heating up the air.

FIG. 5 shows an operating condition in which the valve V3 is in the closed position as in FIG. 4, while the valves V1, V2 are in reversed positions with respect to those illustrated in FIG. 4, so that only the air flow through the duct 230 and through the evaporator E' is activated. In this condition, the flow of air entering the duct 2 activated by the auxiliary fan 30 is cooled before continuing towards the passenger compartment.

As is understood, the assembly allows activation of a flow of cold air or hot air towards the passenger compartment of the motor-vehicle even when the motor-vehicle is parked with the engine off, with the driver outside the motor-vehicle. The compressor C' of the auxiliary refrigeration circuit is small with reduced power, which has the sole object of causing a temperature change in the passenger compartment of the motor-vehicle in the direction of the required temperature even before the driver enters the motor-vehicle. This allows the driver, once on board to activate the main refrigeration circuit and reach the required temperature in a shorter time compared to conventional systems and/or with a lower energy expenditure.

Figure 7:
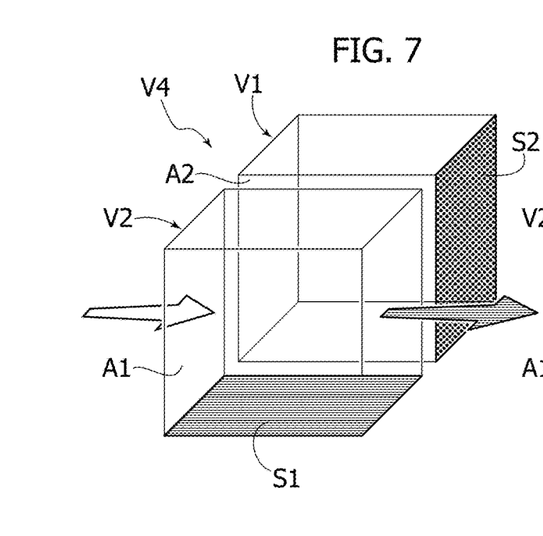
FIGS. 7-9 are schematic views illustrating different operating conditions of two valves for controlling the flow of air to the condenser and to the evaporator of the auxiliary refrigeration circuit.
Figure 8:
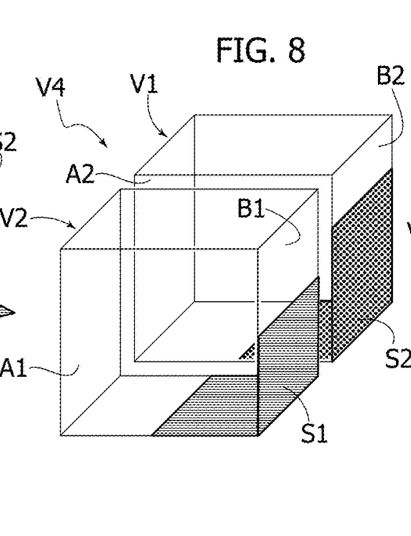
Figure 9:
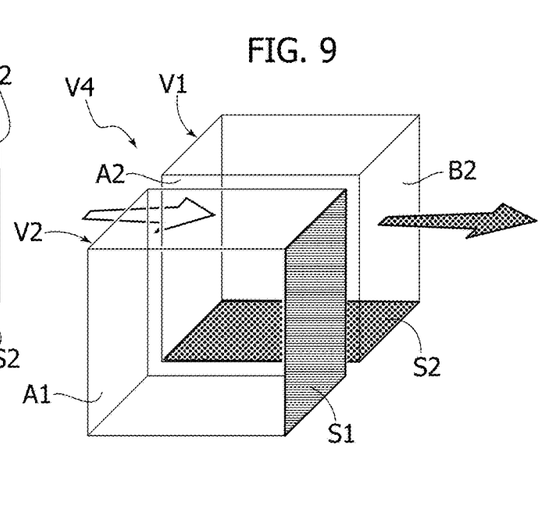

FIGS. 7-9 illustrate three different operating conditions of an additional embodiment of a valve assembly V4 incorporating the valves V1, V2. The assembly comprises a single hollow valve body which incorporates the valve body V1 and the valve body V2. The aforesaid hollow body defines an inner chamber of the valve V1 and an inner chamber of the valve V2, which communicate with each other. Each of the two valves V1, V2 has an inlet opening A1, A2 and an outlet opening B1, B2 defined on opposite walls of the valve body. The inlet A1 receives cooled air from the evaporator E'. The inlet A2 receives heated air from the condenser C'.

Each of the two valves V1, V2 comprises a gate valve disc S1 or S2, which is slidably guided between a first end position in which it completely obstructs the outlet opening B1 or B2 and leaves an opening formed on the lower side of the valve body free, and a second end position, in which the gate valve disc S leaves the outlet opening B1 or B2 free and obstructs the lower opening.

In the illustrated example, each of the two discs S1 and S2 consists of a leaf element guided in a slidable manner along an L-shaped path between its two opposite end positions. FIGS. 7-9 do not illustrate the constructive details of the assembly V4, nor the actuator means of the movement of the leaf element discs S1 and S2, since they can be made in any known manner. For example, the two ends of each leaf element S1 and S2 could be connected to each other by means of a metal cable including a toothed portion engaged on a drive pinion, controlled by an electric motor.

FIG. 7 shows the operating condition in which the disc S1 leaves the outlet B1 free, while the disc S2 obstructs the outlet B2, so that the air cooled by the evaporator E continues towards the vehicle passenger compartment. In this condition, the heat of the condenser is discharged through the unobstructed lower opening.

FIG. 9 shows the operating condition in which the disc S2 leaves the outlet B2 free, while the disc S1 obstructs the outlet B1, so that the air heated by the condenser D' continues towards the vehicle passenger compartment.

FIG. 8 shows an intermediate condition, in which the two discs move in counter-phase to each other to achieve opposite operating positions.

Figure 10:
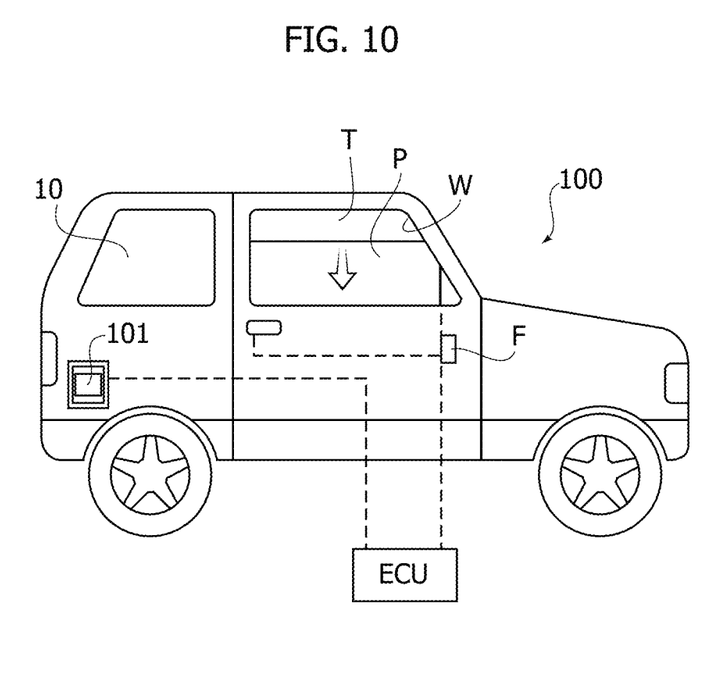
FIG. 10 is a schematic view of a motor-vehicle equipped with a system according to the invention for activating the natural circulation of air through the passenger compartment of the motor-vehicle, according to the disclosures of the present invention.
Figure 11:
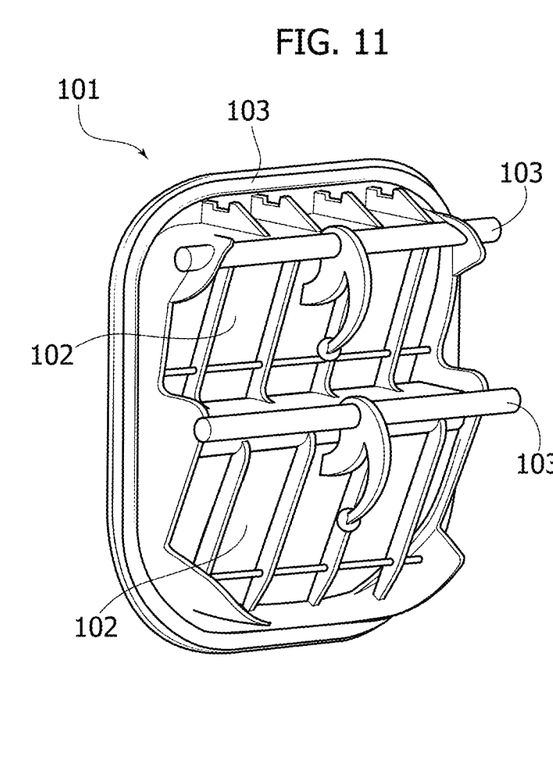
FIG. 11 is a perspective view of a pair of shutters forming part of the system illustrated in FIG. 10.

FIGS. 10, 11 refer to an essential characteristic of the present invention. A motor-vehicle 100 (FIG. 10) is provided at the rear/lower part with one or more electrically-operated valves 101, of the type illustrated, for example, in FIG. 11, wherein, for example, two overlapping shutters 102 are provided, mounted in an articulated manner over a supporting frame 103, which is fixed to the bodywork of the motor-vehicle, outside of it. Each shutter valve 102 has its upper side rigidly connected to a hinge shaft 103, which can be rotated by means of an electric actuator, for example, an electric motor (not illustrated) to cause each shutter valve 102 to pivot between a closed position and an open position. The electronic control unit (ECU) of the motor-vehicle comprises one or more electronic circuits programmed to simultaneously activate an opening of the shutters 102 of each valve 101, and at least partial opening of the windows W of the side doors of the motor-vehicle by activating a control device F for lowering the glass P of the windows W. The ECU can be programmed to lower the glass P only slightly, in order to create openings T of communication between the atmosphere and the passenger compartment of the motor-vehicle.

In certain climatic conditions, for example, when the motor-vehicle is parked for a prolonged time in summer, exposed to solar radiation, the opening of the shutters 102 and the partial lowering of the glass P gives rise to the natural circulation of air through the passenger compartment, since it automatically generates a flow of air that enters the passenger compartment from the valve assembly 101, located in a lower position with respect to the windows W, and the openings T left free by the glass P, which are in a higher position.

According to the invention, both the auxiliary refrigerating circuit and the ventilation system illustrated in FIG. 10 can be controlled by one or more on-board electronic circuits of the motor-vehicle according to predetermined programs, so as to allow the driver, even before boarding the motor-vehicle, to bring the temperature inside the passenger compartment closer to an ideal temperature that allows the best comfort for the user.

According to another aspect of the invention, an automatic activation mode of the passenger compartment ventilation is envisaged, without an on-board driver, which can be controlled simply and easily by the user by means of a dedicated application that resides on an electronic interface device, such as a smart-phone, a tablet or the like. The electronic control circuits which are part of the motor-vehicle control unit are programmed to receive input signals from the interface device and to consequently activate an air conditioning mode of the passenger compartment.

Figure 12:
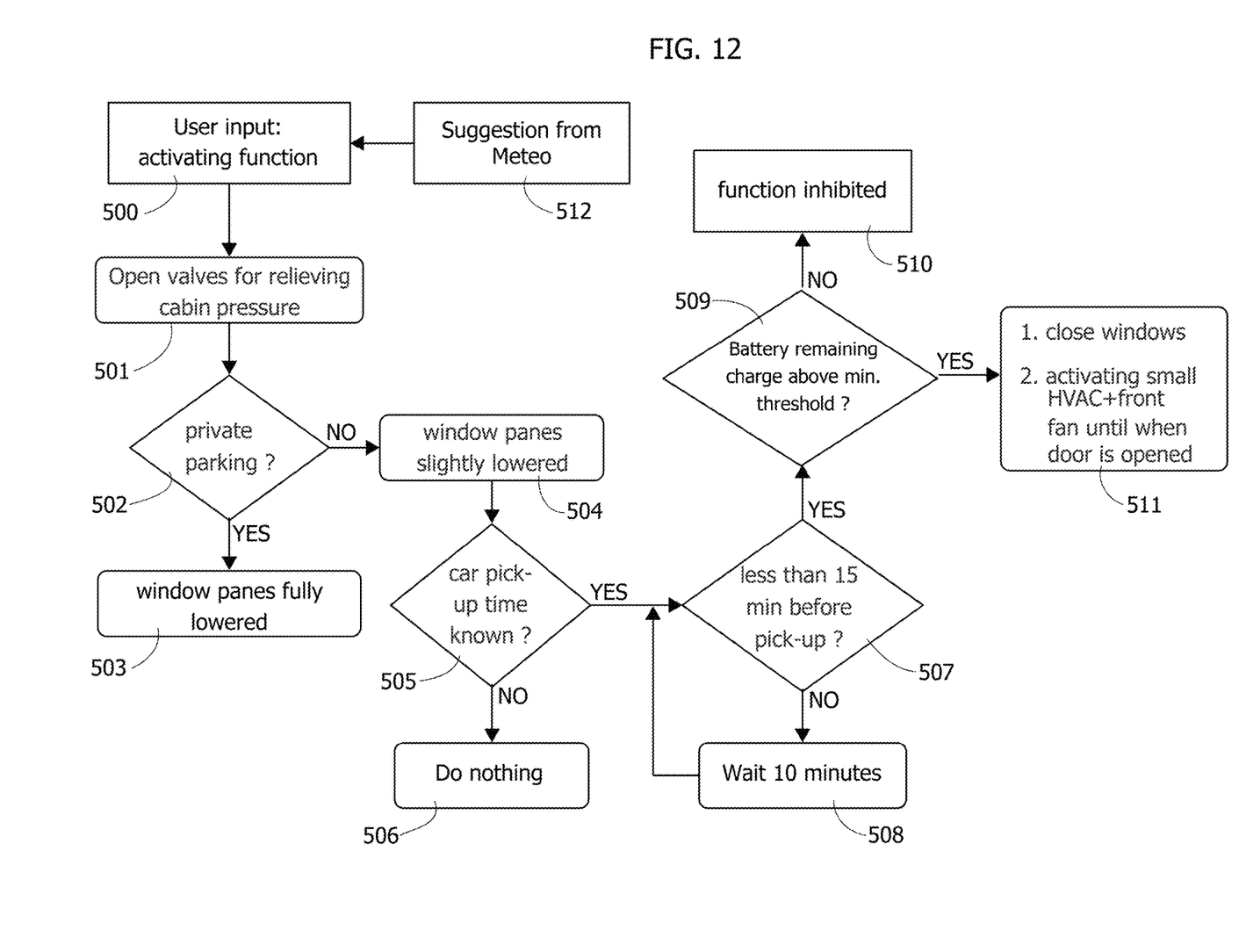
FIG. 12 illustrates a flow chart relating to an example of control methods of a preferred embodiment of the system according to the invention.

In FIG. 12, the block 500 indicates a step in which the user gives an input command to activate the heating or cooling function of the passenger compartment of a parked vehicle with the engine off, with the driver outside the motor-vehicle.

The block 501 refers to a preferred but non-mandatory step, which therefore may not even be provided, in which the opening of the valve 101 is actuated, to discharge any overpressure existing inside the passenger compartment of the motor-vehicle. The block 502 illustrates a step in which the user is asked to indicate whether the motor-vehicle is in a guarded parking space or not. In the event of an affirmative answer, step 503 then follows, in which the complete lowering of the side windows of the motor-vehicle is automatically activated, in order to ventilate the passenger compartment as much as possible. This condition is, therefore, only implemented provided that the motor-vehicle is in a guarded place, due to security problems against break-ins. In the case of a negative response, step 504 is then activated in which the windows are lowered only slightly, so as to create a ventilation opening in the passenger compartment. In the case of the example illustrated here, after step 504, step 505 then follows, in which the user is asked whether he can predict the time in which he will board the motor-vehicle to use it. In the case of a negative answer, step 506 then follows in which the system does not take any further action. In the case of a positive answer, step 507 then follows in which the user is asked whether the time remaining before picking-up the motor-vehicle is less than a determined time (for example 15 minutes). If the answer is negative, the question is repeated at predetermined time intervals, for example every 10 minutes (block 508). If the answer is affirmative, block 509 then follows in which the system checks whether the charge of the battery of the motor-vehicle is above a minimum threshold. If the answer is negative, the system does not activate the function discussed here (block 510). If the answer is affirmative, the system initially controls the closing of the windows, and at a later time, activation of the auxiliary refrigeration circuit and activation of the auxiliary fan, and possibly also of the main fan to activate the flow of air into the auxiliary portion 201 of the air guide duct 2. At the same time, the system arranges the valve system in order to enable the flow of air through the evaporator of the auxiliary refrigeration circuit to cool the air flow entering the passenger compartment, without the need to ignite the internal combustion engine of the motor-vehicle.

As already indicated, the auxiliary refrigeration assembly has a small compressor C' with reduced power which, however, is sufficient to change the temperature inside the passenger compartment of the motor-vehicle by approaching the required temperature, before the driver climbs on board the motor-vehicle. In this way, once on board, the driver can reach the required temperature by activating the main refrigeration system, but will reach this target in a shorter time and/or with less energy consumption than is possible with a conventional system.

If the required function is that of heating the passenger compartment, the step at block 100 passes directly to block 505, without causing any lowering of the windows of the motor-vehicle. When block 511 is reached, it is then not necessary to activate any window closing, the auxiliary refrigeration circuit and the auxiliary fan must be activated, and the valve system must be arranged in such a way as to enable the flow of air through the condenser of the auxiliary refrigeration circuit, which thus heats the air flow entering the passenger compartment of the motor-vehicle. In this case as well, of course, the system is able to change the temperature inside the passenger compartment so that it approaches the required one, in such a way as to make the step to reach the required temperature quicker and/or less energy-consuming when the driver (once he has entered the motor-vehicle) ignites the internal combustion engine and activates the passenger compartment heater. The system may also provide an initial step 512 in which an input is received from a weather forecast system, for example, to avoid opening the windows if the vehicle is in the rain.

Figure 13:
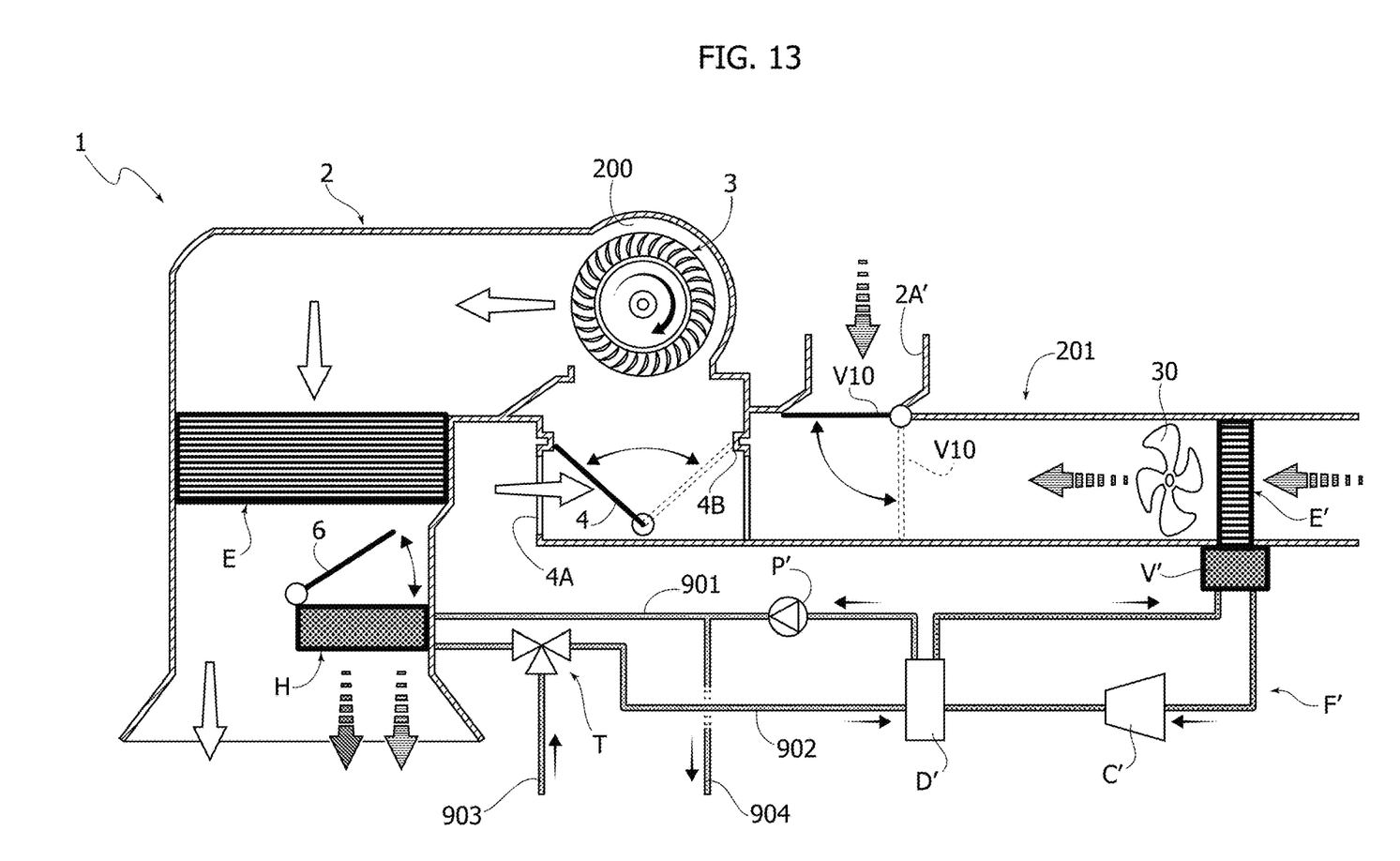
FIG. 13 illustrates a variant of FIG. 2, corresponding to a second embodiment.

FIG. 13 illustrates a second embodiment. In FIG. 13, the parts in common with FIG. 2 and with FIG. 6 are indicated with the same references. In this case, in addition to the conventional passenger compartment heater H, in the form of a heat exchanger arranged in said air guide duct 2, and connected to the main circuit H1 for the coolant of the internal combustion engine of the motor-vehicle, an auxiliary circuit H2 is also provided for the coolant of the internal combustion engine, including a closed-loop path 901, 902 for the engine coolant, by means of which the liquid circulates through the condenser C' of the auxiliary refrigeration circuit F' and then through said heater H, and then going back through said condenser C'. An electrically-operated pump P' activates circulation of the liquid through the auxiliary circuit H2 for the coolant.

Only the evaporator E' is arranged in the inlet portion 201 (so that the valve system of FIG. 2 can be simplified). A single valve V10 enables the flow from the inlet 2A through the evaporator E' or from an auxiliary inlet 2A', from which the air can pass into the main portion 200 of the duct 2 without passing through the evaporator E'.

An electronically-controlled communication valve T controls the communication between the auxiliary circuit H2 and the main circuit H1 for the coolant. The valve T has:
    a first operating position in which the auxiliary circuit H2 for the coolant is insulated with respect to the main circuit H1, so that if the auxiliary refrigeration circuit F' is active, the liquid is able to draw heat from said condenser C' of the auxiliary refrigeration circuit and to deliver it by means of said passenger compartment heater H to an air flow directed towards the passenger compartment, even if the internal combustion engine is idle, and
    a second operating position in which the auxiliary circuit H2 for the coolant is in communication with the main circuit H1 for the coolant, (in particular with the radiator of the motor-vehicle) so that during operation of the internal combustion engine, the passenger compartment heater H receives liquid that is heated by said engine according to the conventional art.

As can be seen, with this embodiment as well, it is possible to activate a cooling mode and a heating mode of the passenger compartment air, with the motor-vehicle stationary with the engine off and the driver out of the motor-vehicle.

A further advantage of the solution of FIG. 13 lies in the fact that when the driver gets into the motor-vehicle and starts the engine, the engine coolant is already partially warm, so that the warm-up time is reduced and fuel consumption is decreased.

Of course, without prejudice to the principle of the invention, the details of construction and the embodiments may vary widely with respect to those described and illustrated purely by way of example, without departing from the scope of the present invention.

What is claimed is:

1. A motor-vehicle having a motor-vehicle structure defining a passenger compartment equipped with one or more electrically-operated windows, said motor-vehicle comprising:
    one or more electrically-operated valves, arranged on a structure of the motor-vehicle in a lower position with respect to said windows so that the passenger compartment of the motor-vehicle communicates with an external environment; and
    one or more electronic control units programmed to activate a ventilation mode of the passenger compartment when the motor-vehicle is parked with the engine off, even with a driver outside the motor-vehicle, said passenger compartment ventilation mode comprising controlling at least a partial opening of one or more windows and an opening of the one or more of said valves for generating a natural air flow through the one or more of said valves from a bottom upwards through the motor-vehicle passenger compartment and through the one or more windows, and
    wherein said one or more valves each comprise at least one shutter having an upper side mounted pivoting about an axis substantially horizontal to the structure of the motor-vehicle,
    wherein said one or more electronic control units are programmed to activate the ventilation mode of the passenger compartment to cause the at least partial opening of said one or more windows and to cause the opening of said one or more valves when the motor-vehicle is parked with the engine off, with the driver outside the motor-vehicle, said activation of the ventilation mode being controllable by a user by means of an electronic interface device, and
    wherein said motor-vehicle is also provided with an auxiliary refrigeration system separate from said one or more valves, said auxiliary refrigeration system located in an auxiliary portion of a duct in fluid communication with and upstream of a primary refrigeration and heating system located in a main portion of the duct such that an airflow from said auxiliary refrigeration system flows to said main portion of the duct and passes said primary refrigeration and heating system when said auxiliary refrigeration system is activated to cool the passenger compartment of the motor-vehicle when the motor-vehicle is stationary with the engine off, even with the driver outside the motor-vehicle, both the auxiliary refrigerating system and the ventilation mode being controlled by said electronic control units of the motor-vehicle, so as to allow the driver, before boarding the motor-vehicle, to bring the temperature inside the passenger compartment closer to an ideal temperature that allows the best comfort for the user.

2. A motor-vehicle according to claim 1, wherein said shutter is rigidly connected to a shaft rotatably mounted about said substantially horizontal axis on the structure of the motor-vehicle, said shaft being driven into rotation by means of an electric actuator.

3. A motor-vehicle according to claim 1, wherein each valve of said one or more valves comprises a pair of shutters that are superimposed upon each other.

4. A motor-vehicle according to claim 1, wherein said one or more electronic control units are programmed to subordinate said activation to one or more conditions.

5. The motor-vehicle of claim 4, wherein said one or more conditions comprise a signal confirming the fact that the motor-vehicle is in a guarded place and a signal confirming the absence of rainfall.

6. A motor-vehicle according to claim 1, wherein the electronic interface device comprises a smartphone.

7. A motor-vehicle according to claim 1, wherein the electronic interface device comprises a tablet.

8. A motor-vehicle having a motor-vehicle structure defining a passenger compartment equipped with one or more electrically-operated windows, wherein said motor-vehicle comprises:

one or more electrically-operated valves, arranged on a structure of the motor-vehicle in a lower position with respect to said windows, so that the passenger compartment of the motor-vehicle communicates with the external environment;

one or more electronic control units programmed to activate a ventilation mode of the passenger compartment when the motor-vehicle is parked with the engine off, even with a driver outside the motor-vehicle, said passenger compartment ventilation mode comprising controlling at least partial opening of the one or more windows and the opening of the one or more of said valves for generating a natural air flow through the one or more of said valves upwards through the motor-vehicle passenger compartment and through the one or more windows;

wherein the one or more electronic control units are programmed to activate a ventilation mode of the passenger compartment, by at least partial opening of the one or more windows and by opening the one or more valves when the motor-vehicle is parked with the engine off, with the driver outside the motor-vehicle, said activation being controllable by a user by means of an electronic interface device; and wherein said motor-vehicle is provided with an electrically operated auxiliary refrigeration system separate from said one or more valves, said auxiliary refrigeration system located in an auxiliary portion of a duct and in fluid communication with and upstream of a primary refrigeration and heating system located in a main portion of the duct such that an airflow from said auxiliary refrigeration system flows to said main portion of the duct and passes said primary refrigeration and heating system when said auxiliary refrigeration system is activated to cool the passenger compartment of the motor-vehicle when the motor-vehicle is stationary with the engine off, even with the driver outside the motor-vehicle; and both the auxiliary refrigeration system and the ventilation mode being controlled by said electronic control units of the motor-vehicle, so as to allow the driver, before boarding the motor-vehicle, to bring the temperature inside the passenger compartment closer to an ideal temperature that allows the best comfort for the user.

* * * * *